(12) United States Patent
Marett et al.

(10) Patent No.: US 8,763,843 B2
(45) Date of Patent: Jul. 1, 2014

(54) WATER STORAGE ASSEMBLY

(76) Inventors: Graeme Alexander Marett, Gladesville (AU); Andrew Waudby, Artarmon (AU)

( * ) Notice: Subject to any disclaimer, the term of this patent is extended or adjusted under 35 U.S.C. 154(b) by 1648 days.

(21) Appl. No.: 12/280,461

(22) PCT Filed: Feb. 22, 2007
(Under 37 CFR 1.47)

(86) PCT No.: PCT/AU2007/000200
§ 371 (c)(1),
(2), (4) Date: Jun. 3, 2011

(87) PCT Pub. No.: WO2007/095683
PCT Pub. Date: Aug. 30, 2007

(65) Prior Publication Data
US 2012/0024847 A1 Feb. 2, 2012

(30) Foreign Application Priority Data

Feb. 22, 2006 (AU) ............................... 2006900871

(51) Int. Cl.
*B65D 90/02* (2006.01)
*B65D 1/32* (2006.01)
*A47G 19/22* (2006.01)
*B65D 8/04* (2006.01)
*B65D 35/14* (2006.01)
*B65B 1/04* (2006.01)
*B65B 3/16* (2006.01)
*E03B 11/00* (2006.01)

(52) U.S. Cl.
USPC ........... 220/565; 220/723; 220/720; 220/668; 220/495.06; 141/10; 141/114; 141/313; 141/316; 137/255

(58) Field of Classification Search
CPC .. E03B 3/03; B65D 88/1618; B65D 88/1631; B65D 88/1637; B65D 88/1612; B65D 88/027
USPC ........... 220/9.2, 565, 668, 495.06, 23.91, 9.3, 220/495.1, 9.4, 4.28, 720, 723; 141/10, 141/114, 313, 316; 137/264, 255
See application file for complete search history.

(56) References Cited

U.S. PATENT DOCUMENTS

| 297,221 | A | * | 4/1884 | Bergen | 137/170.4 |
| 2,378,159 | A | * | 6/1945 | Royer | 220/565 |
| 2,609,118 | A | * | 9/1952 | Cattaneo | 220/723 |
| 5,050,775 | A | * | 9/1991 | Marquardt | 222/93 |
| 6,575,629 | B1 | | 6/2003 | Perkins | |
| 6,755,324 | B2 | * | 6/2004 | Geshay | 222/1 |
| 2002/0108179 | A1 | * | 8/2002 | Kiser | 5/654 |

FOREIGN PATENT DOCUMENTS

| GB | 2301086 A | 11/1996 |
| WO | 2004053242 A1 | 6/2004 |

OTHER PUBLICATIONS

International Search Report for PCT/AU2007/000200.

* cited by examiner

*Primary Examiner* — Fenn Mathew
*Assistant Examiner* — Don M Anderson
(74) *Attorney, Agent, or Firm* — Brooks Kushman P.C.

(57) ABSTRACT

A water storage assembly is disclosed including a flexible bladder having a water storage cavity, a water inlet in fluid communication with said cavity, a water outlet in fluid communication with said cavity, and a rigid frame adapted to support said bladder wherein said bladder wherein said bladder is secured to said rigid frame and said bladder is adapted to expand and contract upon flow of said water into and out of said cavity.

11 Claims, 5 Drawing Sheets

WATER STORAGE ASSEMBLY

FIELD OF THE INVENTION

The present invention relates to a water storage assembly and in particular to the storage of rainwater or grey water in a flexible bladder.

BACKGROUND OF THE INVENTION

Conservation of water has become a significant issue worldwide due to the reduction in rainfall, increase in population and salinity problems with existing water sources. These problems have increased the need to recycle and optimise use of existing water. For a household, the simplest way to reduce the quantity of mains water used is to collect rainwater in a tank. Water tanks capture rainwater at the point of use, for example, a dwelling, factory, school, building or the like. Unfortunately, due to an increased population and subsequent over development, adequate space in built-up areas to house water tanks is a significant problem. Further, with the growing focus on aesthetic looks of a dwelling or building, many people object to water tanks being visible.

The deficiencies of existing water tanks has led to the development of flexible water storage systems, such as that shown in WO 2004/053242. Flexible water storage systems are advantageous as they are more easily transportable when flat-packed than rigid tanks; relatively simple to construct on site; can be located in areas that are out of sight; in difficult access situations or where height restrictions exist (such as, under floors, decks or in walls) and complicated piping is generally not required.

However, the system of WO2004/053242 has been found to have practical installation and operation limitations. For example, the system uses a top fill method with a pivoting swing arm having o-rings as the method for sealing between the two arms. The o-rings have been found to leak after a period of time when the system is full. The swing arm also requires a significant space about it to operate correctly, thereby limiting the location in which the system can be installed and the potential capacity of the system as the fill potential fill height is limited by the presence of the filling mechanism. The o-rings have also been found to jam the swing arm mechanism in place thus preventing the system from filling to its full capacity.

Further, if a second reservoir is used, it is filled through a different inlet pipe from the primary reservoir. It is filled from the outlet pipe of the primary reservoir which in the case of WO2004/053242 is only a 32 millimeter pipe which restricts the flow. This has the potential to cause water to back up in the storm water downpipes because the primary reservoir is filling via a 90 mm pipe but only emptying to subsequent reservoirs via a 32 mm pipe. Still further, the system can not be installed by a home handyman.

Accordingly, there is a need to provide an efficient flexible water storage assembly to store rainwater or grey water which is easier to construct, install and operate is than existing systems, does not leak at junctions, will enable fixed pipe work to remain fixed without the risk of breaking from the weight or movement of the system, requires less maintenance and will fill several bladders more quickly and simultaneously and that can be filled via a 100 mm pipe or a 90 mm pipe. Further, there is a need for a flexible water storage assembly that can be installed by a home handyman.

OBJECT OF THE INVENTION

It is an object of the present invention to overcome or ameliorate one or more of the disadvantages of the prior art, or at least to provide a useful alternative.

SUMMARY OF THE INVENTION

The present invention provides a water storage assembly including:

a flexible bladder having a water storage cavity, said bladder being adapted to expand and contract upon flow of water into and out of said cavity, one or more water inlets in fluid communication with said cavity, one or more water outlets in fluid communication with said cavity, a rigid frame adapted to support said bladder; and one or more support slings having first and second ends, said first end being connected to said frame, and said second end being connected to said bladder, said sling being adapted to limit the movement of the bladder relative to the frame.

The water inlet and the water outlet are preferably mounted on a plate fixed relative to said frame.

The water inlet preferably includes an overflow adapted to direct water away from the bladder once the bladder is full.

The inlet is preferably positioned at approximately half of the vertical height of the bladder when full.

The water storage assembly preferably including a valve or number of valves adapted to isolate the flow of water through the bladder.

The water storage assembly preferably includes a plurality of said bladders.

The bladders are preferably connected to each other in parallel via the inlet pipes and the outlet pipes.

BRIEF DESCRIPTION OF THE DRAWINGS

A preferred form of the present invention will now be described by way of example only with reference to the accompanying drawings wherein.

DETAILED DESCRIPTION OF THE PREFERRED EMBODIMENTS

Figure 1:
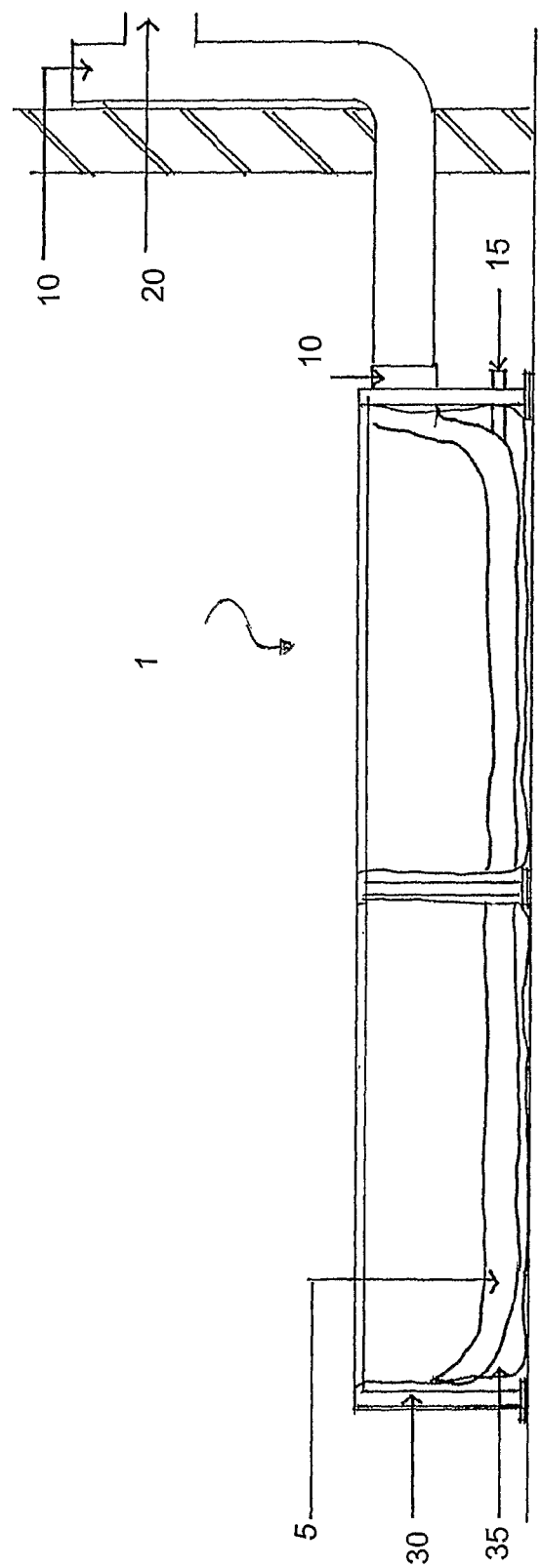
FIG. 1 is a side elevational view of an assembly of an embodiment of the present invention, shown empty.
Figure 2:
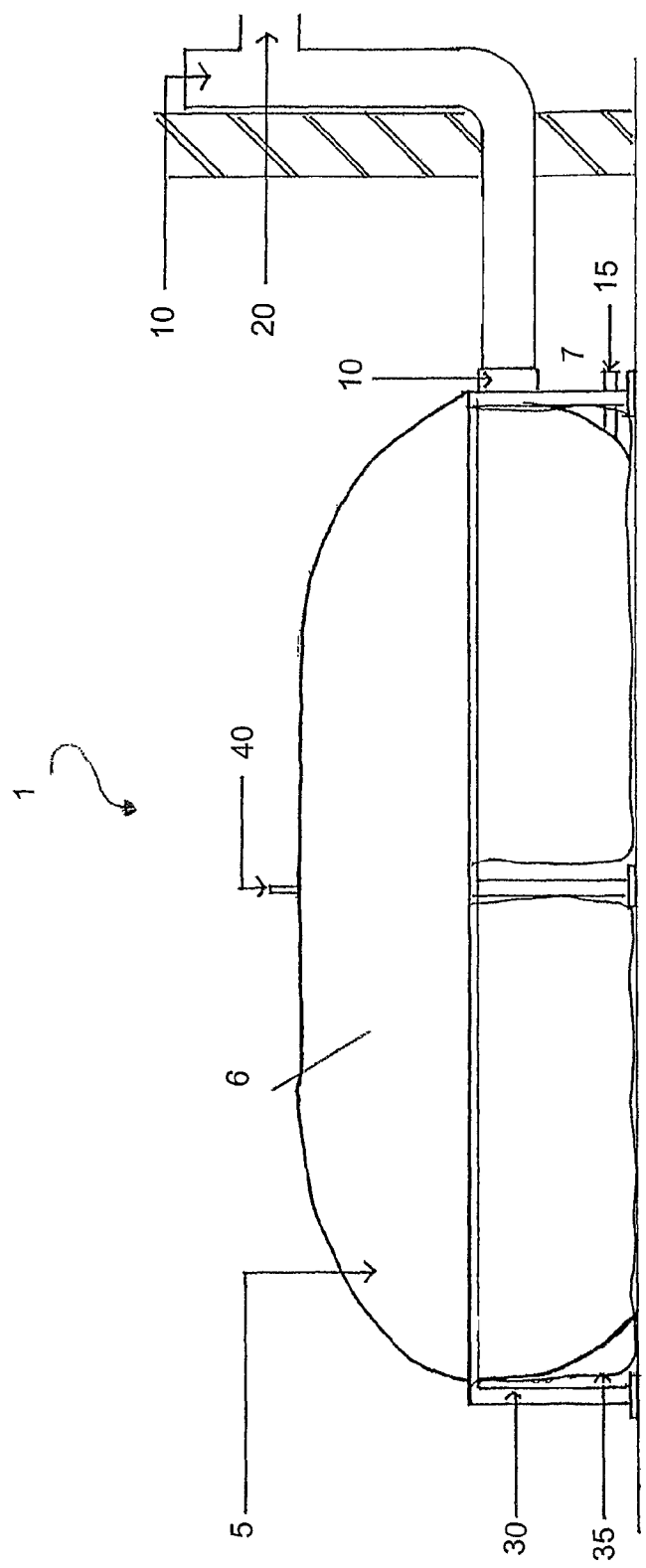
FIG. 2 is a side elevational view of FIG. 1, shown full.
Figure 3:
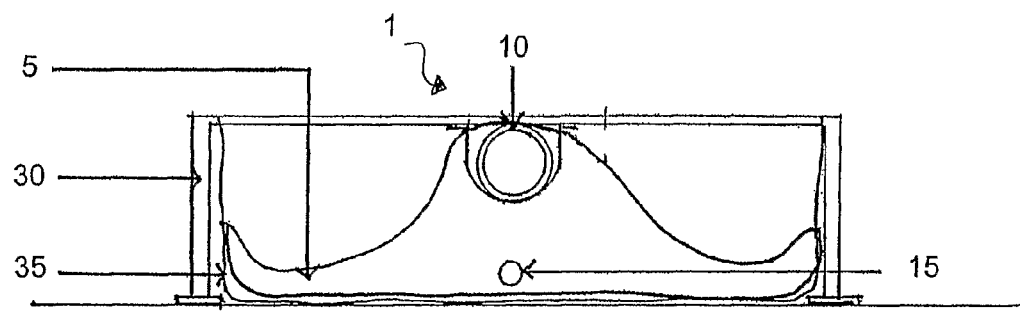
FIG. 3 is front elevational view of an assembly of an embodiment of the present invention, shown empty.
Figure 4:
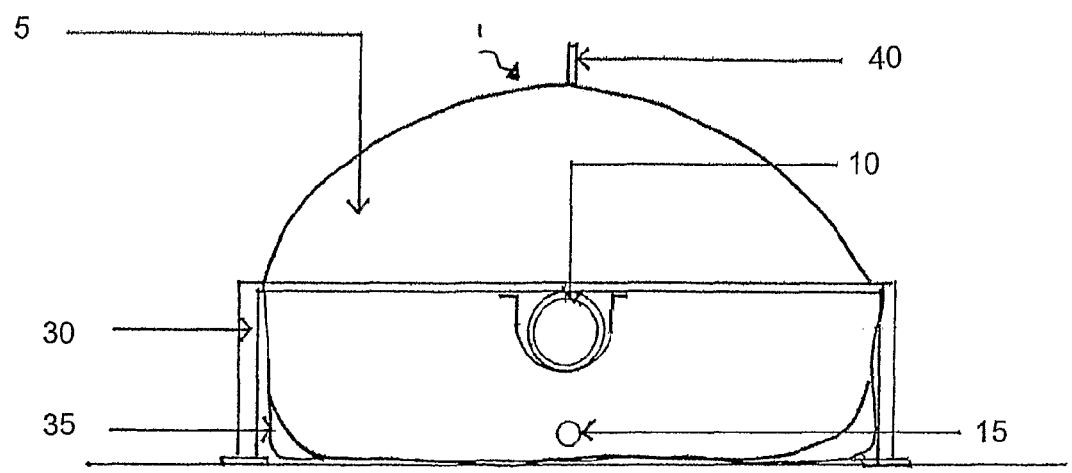
FIG. 4 is a front elevational view of FIG. 3, shown full.

In the accompanying drawings, there is schematically depicted a water storage assembly 1 including a flexible bladder 5 having an internal cavity 6 permitting the storage of water or other liquids. An inlet duct 10 is connected to the cavity 6 within the bladder 5. The inlet duct 10 may be 90 mm or 100 mm in diameter or another suitable size.

The inlet duct 10 permits the flow of water under the force gravity into the bladder 5. One or more outlet ducts 15 are connected to the cavity 6 and are operable to dispense water from the cavity 6 to a user. The inlet duct 10 includes an overflow outlet 20 at some point within the inlet pipe which is operable to direct water away from the m bladder 5 when the bladder 5 is full. The overflow outlet 20 is located above the level of the bladder 5, corresponding to the intended maximum fill volume of the bladder 5. The overflow 20 may be positioned close to the bladder 5 or in fact some distance away, provided that the invert of the overflow is set to the maximum fill height of the bladder 5.

A valve 25 is located on either the inlet duct 10 or outlet duct 15 and is operable to isolate the flow of water through the bladder 5.

A rigid support frame 30 supports the bladder 5. The frame 30 is in the form of a rectangular prism having an internal volume adapted to contain approximately half of the bladder 5 when full. The frame 30 in a preferred form is made from steel bars and may include several members or sub frames that can easily be assembled in restricted areas such as beneath floors.

The inlet pipe 10 and the outlet pipe 15 are connected to a fixed plate 7 which is secured to the frame 30. The plate 7 ensures that the location and angular orientation of the pipes 10, 15 does not change regardless of the position of the bladder 5 wall, or the amount of water contained therein.

The assembly 1 further includes one or more fabric slings 35. All of the sides of the rigid frame 30 support the slings 35. A first end of each fabric sling 35 is threaded in a loop around a portion of the frame 30, and a second end of the sling 35 is connected to the bladder 5. The sling 35 protects the bladder 5 from directly contacting the ground upon which the assembly 1 is located and provides protection from possible sharp objects that might harm the bladder. The sling 35 controls the expansion footprint of the bladder 5, and also limits the movement of the bladder 5 relative to the frame, and hence influences the shape and internal volume of the bladder 5 during filling. The fabric sling 35 can be made from a geo-textile fabric or the like. The frame 30 and sling 35 secure the bladder 5 firmly in position, and keep the bladder 5 isolated relative to parts of the surrounding building, such as pylons or beams that could otherwise puncture or damage the bladder 5.

The inlet duct 10 is connected to a rainwater or grey water collection system (not shown) or the like and utilises gravity, such that the water collection point is at a higher potential head (e.g. a gutter) relative to the inlet duct 10 of the bladder 5. However, if necessary a pump 100 may be added to the assembly 1. The assembly 1 may also be combined with other recycling devices utilising mains or grey water.

Figure 5:
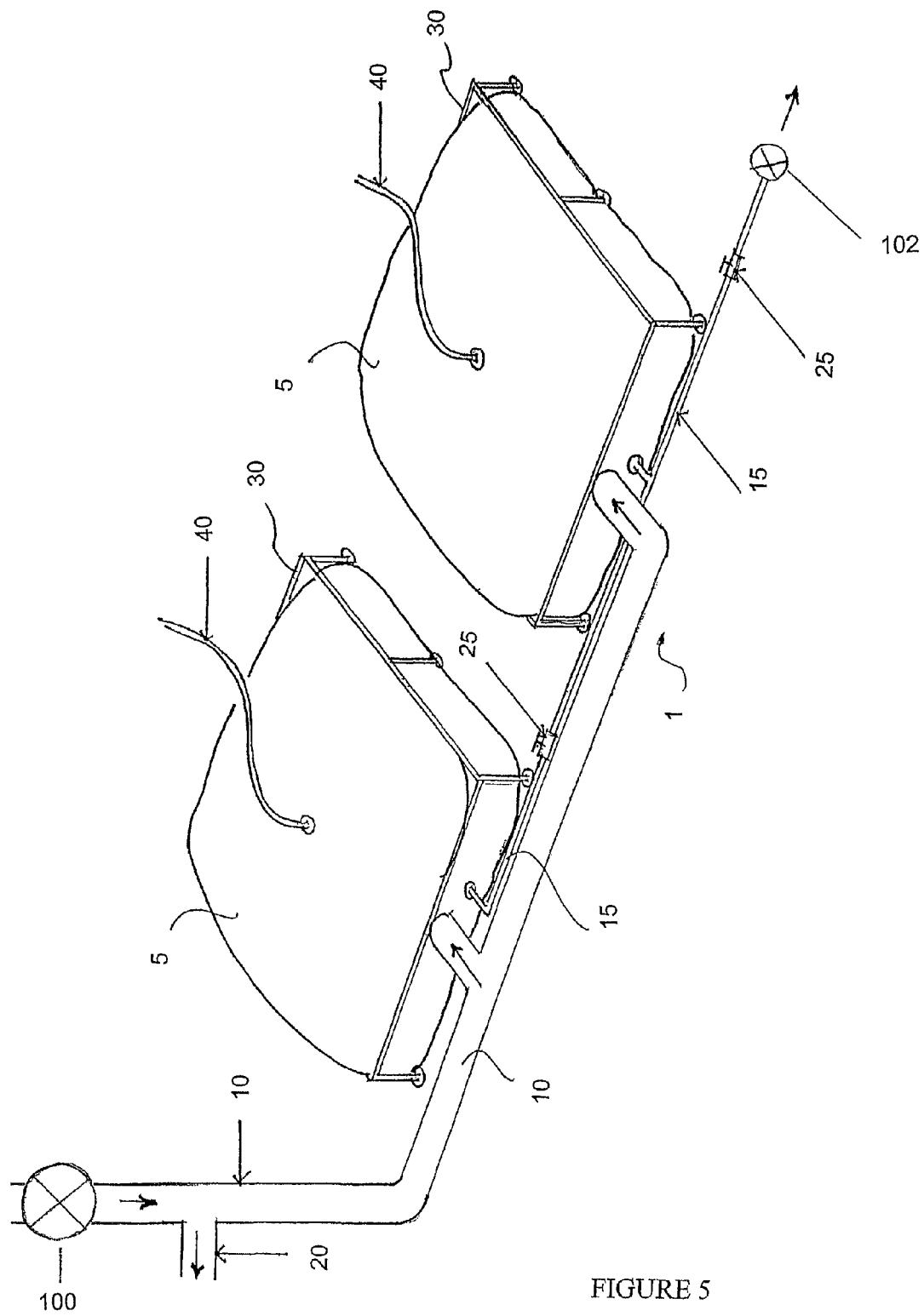
FIG. 5 is a perspective view of a multiple bladder system of an embodiment of the present invention.

In the preferred form (and as best shown in FIG. 5) the assembly 1 includes two or more bladders 5 connected in parallel. The bladders 5 connected in parallel would be connected to the same inlet duct 10 and outlet duct 15. However, the bladders 5 may be connected in parallel, series or any other configuration. In this case, two or more valves 25 may be utilised. The assembly 1 may also include a breather fitting 40 or the like. All the inlets and outlets may have some form of vector protection to prevent the ingress of insects such as mosquitos.

The bladders 5 are designed to be able to sit on uneven surfaces and may be folded or rolled to allow access through restricted entry points such as house sub-floor or wall areas. The inlet duct 10 is preferably a large diameter rainwater delivery pipe made from PVC. The inlet duct 10 allows the bladders 5 to fill simultaneously and efficiently during heavy water flow rates. This is important to ensure the maximum amount of rainwater is captured quickly with minimal loss of rainwater in large downpours.

The outlet duct is preferably a 32 mm PVC pipe, and there are preferably two outlet pipes connected to each bladder 5. This will enable both the connection of multiple bladders and a pump, or alternatively a float chamber to measure when the water level is low when a mains water controller is then used to switch from stored rainwater or grey water to mains water.

In use, assembly 1 is connected to a liquid collection system of a dwelling or other building such as a rainwater collection system. Water (or another liquid to be stored) is gravity fed into the inlet duct 10, filling the cavity within the flexible bladder 5. As the bladder 5 expands the pressure on the water flowing through the duct 10 increases and once the bladder 5 is full, water travelling within the inlet duct 10 is forced out of the overflow 20. Advantageously, there are no moving parts in the overflow 20, the water pressure generated by the increase in potential head simply activates the overflow 20 as required. When two or more bladders 5 are placed in parallel (such as in FIG. 5) the water flowing by gravity from the rainwater collection system or the like flows through the inlet ducts 10 in parallel directly to the cavity within the bladders 5. In this way, the flow is not be disrupted.

In the preferred form, the inlet duct 10 is manufactured of PVC piping or the like and is directly connected to the flexible expandable bladders 5 which will fill until the overflow 20 is reached. Alternatively flexible pipe might also be used. The overflow 20 can have a level which is adjustable by a user to enable the assembly 1 to be adapted for varying height restrictions when the assembly 1 is placed in a sub-floor installation. The overflow 20 would most likely direct the excess water to a stormwater dispersion pit or the like. The outlet 15 is preferably a threaded plastic pipe which delivers water to a pump 102, simple dispersion system or the like.

The bladder 5 may be manufactured from two or more sheets of plastics material welded together to form a sealed unit or the like. It should also be noted that existing systems weld bladders together using a microwave process producing a non-continuous weld. The resultant bladder can leak due to weakness between the finish of one weld and the start of the next weld. The bladder is preferably fabricated using a "wedge" weld producing a continuous weld formed by passing the fabric edge over a heated wedge. One edge passes over the top and the other edge passes underneath. The edges are then compressed under a durable roller system or the like, producing a stronger weld than existing systems.

Though the assembly 1 has been discussed above in respect of a dwelling it should be understood that the assembly 1 can easily be used in any domestic, commercial or industrial application for water or any other liquid. The assembly 1 may also be used outside a dwelling and the fabric may be manufactured from a UV protected material or the like. Where the assembly 1 is installed outside a dwelling, and the critical function of the frame 30 may no longer be required to protect building structures from the expanding assembly 1, a flexible reinforced fabric might be used without the inclusion of the frame 30 provided that the mounting plate 7 supporting the inlet 10 and the outlets 15 is still utilised to connect the pipe work to the flexible bladder 5. The mounting plate 7 would also need to be suitably supported. As the assembly 1 can be significantly compact prior to use it can also be placed in hard to reach locations and expanded in situ. The assembly 1 advantageously fills more efficiently than existing systems, will not leak at junction points as all the pipe joins would be glued. The additional bladders 5 may fill more efficiently than existing systems.

The assembly 1 is very easy to install even by a home handyman and requires very little maintenance and repair due to the fact that it has no moving parts nor does the inlet pipe 10 need to set at a specific angle as it enters the bladder 5. The assembly 1 on account of its simplicity is less likely to fail than existing systems, has far fewer parts and is easier to transport and much faster to install. Further, the inlet duct 10 and outlet duct 15 could be any type of pipe including flexible pipes. A flexible pipe requires less installation time and fewer plumbing parts as a flexible pipe can go around corners without the need for pipe elbows and other fittings.

Although the invention has been described with reference to specific examples, it will be appreciated by those skilled in the art that the invention may be embodied in many other forms.

The invention claimed is:

1. A water storage assembly including:
    a flexible bladder having a water storage cavity, said bladder being adapted to expand and contract upon flow of water into and out of said cavity,
    one or more water inlets in fluid communication with said cavity,
    one or more water outlets in fluid communication with said cavity,
    a plurality of bars that collectively form a rigid frame, the rigid frame being adapted to support said bladder, wherein said water inlet and said water outlet are mounted on a plate fixed to said frame; and
    a support sling having first and second ends, said first end being connected to said frame, and said second end being connected to said bladder, said sling being adapted to limit the movement of the bladder relative to the frame.

2. The water storage assembly of claim 1, wherein said inlet includes an overflow adapted to direct water away from said bladder when said bladder is full.

3. The water storage assembly of claim 1, wherein said inlet is positioned at approximately half of the vertical height of the bladder when full.

4. The water storage assembly of claim 1 including a valve adapted to isolate the flow of water through said bladder.

5. A multiple bladder system comprising:
    a first water storage assembly according to claim 1, wherein the flexible bladder further comprises a first bladder; and
    a second water storage assembly according to claim 1, wherein the flexible bladder further comprises a second bladder.

6. The multiple bladder system of claim 5 wherein the first bladder and the second bladder are connected to each other in parallel.

7. The water storage assembly of claim 1 wherein the plate is fixed to the frame and independent of the bladder such that the inlet pipe and the outlet pipe do not move in response to expansion and contraction of the bladder.

8. A water storage assembly including:
    a flexible bladder defining a water storage cavity, the bladder being adapted to expand and contract upon flow of water into and out of the cavity;
    at least one water inlet in fluid communication with the cavity;
    at least one water outlet in fluid communication with the cavity;
    a plurality of bars that collectively form a rigid frame, the rigid frame being adapted to support the bladder;
    a plate fixed to the frame, wherein the water inlet and the water outlet are mounted to the plate; and
    a support sling having a first end connected to the frame, the support sling being adapted to limit movement of the bladder relative to the frame.

9. The water storage assembly of claim 1 wherein the rigid frame is formed in a generally rectangular prism shape.

10. The water storage assembly of claim 1 wherein the rigid frame defines an internal volume that is adapted to contain a lower portion of the flexible bladder therein when the water storage cavity of the flexible bladder is generally full, such that the flexible bladder extends above the frame.

11. The water storage assembly of claim 1 wherein the plurality of bars are adapted for being assembled to form the rigid frame within a confined space.

* * * * *